(12) United States Patent
Xu et al.

(10) Patent No.: US 7,853,258 B2
(45) Date of Patent: *Dec. 14, 2010

(54) METHODS FOR AIR INTERFACE MESSAGE TRANSFER IN FAST CALL SETUP PROCESSES

(75) Inventors: Baikui Xu, Shanghai (CN); Ling Lv, Shanghai (CN); Tao Wu, Shanghai (CN)

(73) Assignee: Spreadtrum Communications Inc., George Town, Grand Cayman, Cayman Islands (KY)

( * ) Notice: Subject to any disclaimer, the term of this patent is extended or adjusted under 35 U.S.C. 154(b) by 597 days.

This patent is subject to a terminal disclaimer.

(21) Appl. No.: 11/624,299

(22) Filed: Jan. 18, 2007

(65) Prior Publication Data

US 2007/0177573 A1    Aug. 2, 2007

(30) Foreign Application Priority Data

Jan. 18, 2006    (CN)    .................... 2006 1 0023422

(51) Int. Cl.
*H04W 4/00*    (2009.01)

(52) U.S. Cl. .................................. 455/435.1; 455/435.3
(58) Field of Classification Search .............. 455/435.1, 455/435.3
See application file for complete search history.

(56) References Cited

U.S. PATENT DOCUMENTS

| 6,952,411 | B2 * | 10/2005 | Sinnarajah et al. ........... 370/335 |
| 2004/0002337 | A1 * | 1/2004 | Wheeler et al. .............. 455/445 |
| 2005/0141511 | A1 * | 6/2005 | Gopal ...................... 370/395.2 |
| 2005/0260995 | A1 * | 11/2005 | Kim ........................... 455/445 |
| 2007/0041343 | A1 * | 2/2007 | Barreto et al. ............... 370/329 |

* cited by examiner

*Primary Examiner*—Vincent P Harper
*Assistant Examiner*—Michael Irace

(57) ABSTRACT

A method of UU message transfer for fast call setup is disclosed. The method includes encapsulating a Service Request into a RRC Connection Request message. When a UE starts the service sensitive to call setup delays, the RRC Connection Request undergoes non-critical extension. The Service Request and necessary Access Stratum (AS) information are disposed into the extended portion. The RNC, after receiving the extended RRC connection request, extracts the IDT message from the extended RRC Connection Request and sends it to the CN.

5 Claims, 4 Drawing Sheets

METHODS FOR AIR INTERFACE MESSAGE TRANSFER IN FAST CALL SETUP PROCESSES

CROSS-REFERENCE TO RELATED APPLICATION(S)

This application claims priority to Chinese Patent Application No. 200610023422.6 filed on Jan. 18, 2006, the disclosure of which is incorporated herein by reference in its entirety.

TECHNICAL FIELD

The present disclosure relates to methods for call/session setup in Universal Mobile Telecommunications System (UMTS); in particular, to methods for air interface message transfer in fast call setup processes.

BACKGROUND

In communication systems, the duration of call setup (or call setup delays) is a main factor affecting Quality Of Service (QOS). For services sensitive to such delays, such as interactive games and Push to talk Over Cellular services (PoC), the call setup delays in current UMTS systems (usually 6 to 10 seconds) appear to be too long.

The following description is a brief introduction of a call setup process in a typical UMTS system, using a User End (UE) calling another UE as an example. The call setup process is illustrated in FIG. 1 and FIG. 2, which illustrate several main functional units, such as a User End (UE), a NodeB, a Radio Network Controller (RNC), and a Core Network (CN). In addition, in both FIG. 1 and FIG. 2, a user initiated PoC service call in a Packet Service (PS) domain is presumed, and a Radio Resource Control (RRC) connection is established on a Dedicated Channel (DCH).

For the originating UE, a call setup process usually includes the following steps:
1) RRC connection establishment;
2) Non Access Stratum (NAS) signaling connection establishment and NAS signaling exchange;
3) Radio Access Bearer (RAB) establishment.

For the receiving UE, the call setup process is similar to that of the originating UE and mainly includes the following steps:
1) Paging;
2) RRC connection establishment;
3) Non Access Stratum (NAS) signaling connection establishment and NAS signaling exchange;
4) Radio Access Bearer (RAB) establishment.

The following description further analyzes each step of the call setup process described above.

The purpose of establishing a RRC connection is to build a dedicated signaling connection between a UE and a UTRAN (UMTS Terrestrial Radio Access Network including several RNCs and NodeBs) for transferring signaling between the UE and the UTRAN, or between the UE and a CN. In FIG. 1, phase 1:RRC depicts a RRC connection establishment procedure when the UE is in idle mode.

The purpose of establishing the NAS signaling connection is to build a signaling connection between the UE and the CN. The NAS signaling connection establishment and signaling exchange are shown as Phase 2:NAS in FIG. 1 and FIG. 2. The signaling connection establishment mainly includes Service Request for the originating UE, IU connection (between the RNC and CN), Signaling Connection Control Part (SCCP) establishment, authentication and encryption request, Security Mode configuration, Temporary Mobile Subscriber Identity (TMSI) reallocation, Activate Packet Data Protocol (PDP) activation request, etc.

After the NAS signaling connection is established, RAB establishment is started as shown by phase 3:RAB in FIG. 1 and FIG. 2. The CN sends a RAB Assignment Request to the RNC. After receiving the request, the RNC maps from the RAB to a Radio Bearer (RB), and then reconfigures RL (Radio Link), establishes ALCAP, and synchronizes FP to the NodeB. Afterwards, the RNC sends a RB Setup message to the UE. After receiving the RB Setup message, the UE configures RLC, MAC and physical layer and then sends a RB Setup Complete message to the RNC. The RNC, after configuring RLC and MAC, sends a RAB Assignment Response to the CN to notify the successful setup of the RAB at the UTRAN side. The CN then sends an Activate PDP Context Accept message to the UE to inform the UE that data transfer can now commence. Thus, RAB setup is now successful.

From the analysis above, it is clear that the call setup process described above involves many signaling/data connection procedures that can result in a long call setup delays. The call setup delays in a UMTS system often can be longer than that in a GSM system. Therefore, for services sensitive to call setup delays, reducing the call setup delays is necessary in a UMTS system in order to improve user satisfaction.

DETAILED DESCRIPTION

Figure 1:
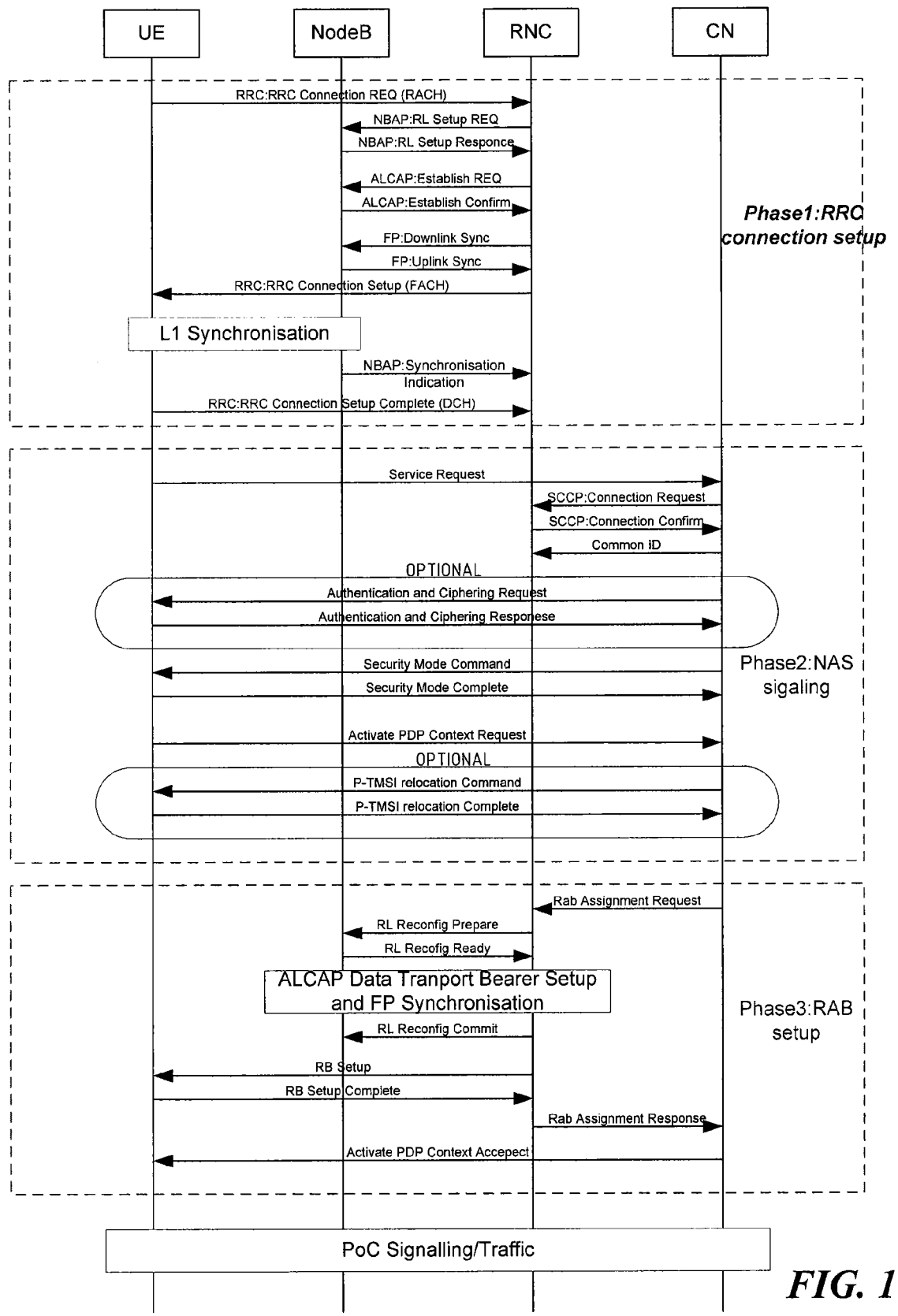
FIG. 1 is a flow chart of a call setup process in accordance with the prior art.
Figure 2:
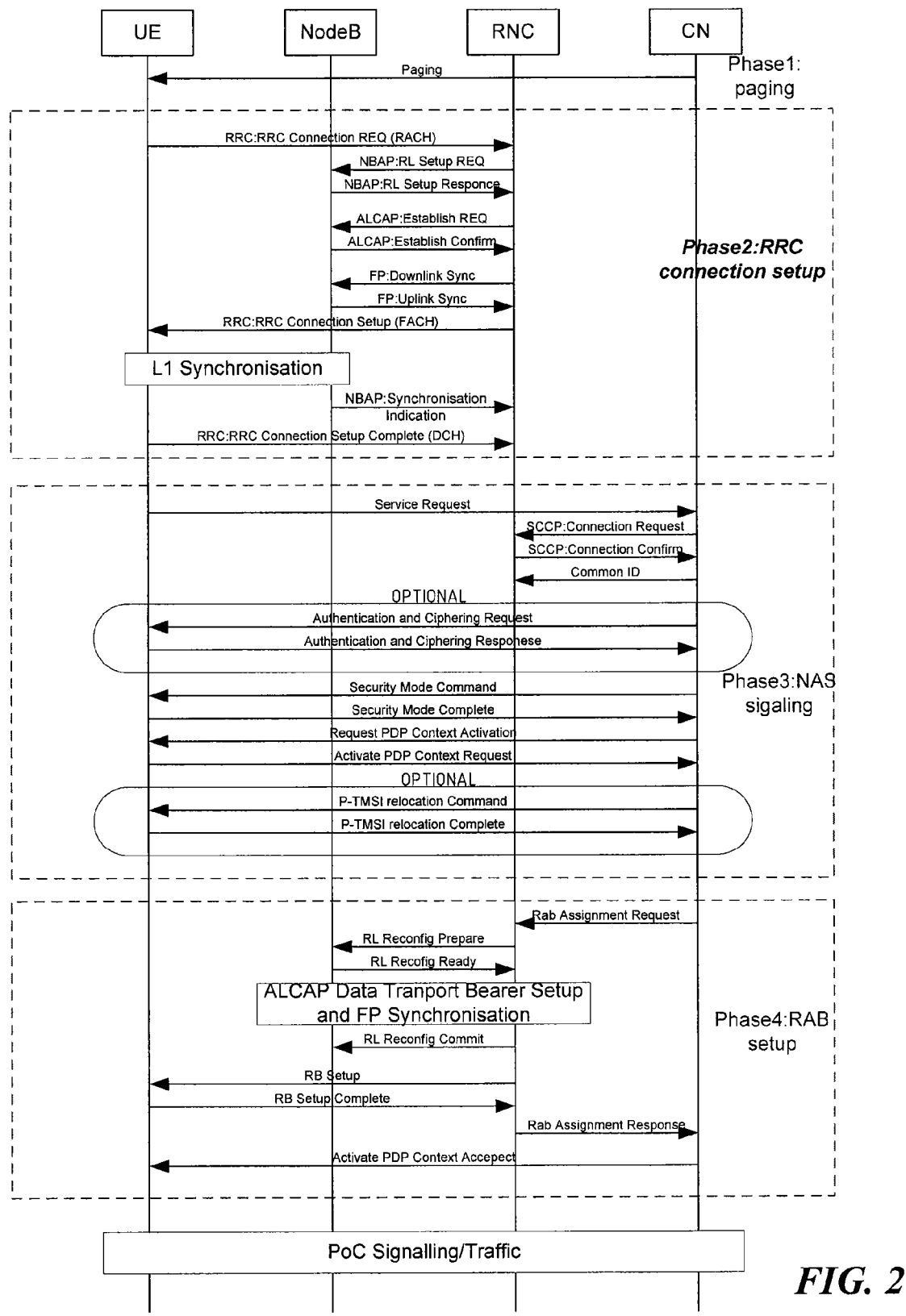
FIG. 2 is a flow chart of a call setup process in accordance with the prior art.

The present disclosure provides methods of message transfer in UU interface for fast call setup. Embodiments of the disclosed method can be applied to services sensitive to call setup delays. In accordance with an embodiment of the present invention, a method includes encapsulating a Service Request in a RRC Connection Request message and also includes the following steps:

Step 1: When a UE starts a service sensitive to call setup delays, the NAS of the UE informs the RRC layer whether to start fast call setup procedure. If the NAS of the UE informs the RRC layer not to start fast call setup procedure, the RRC would directly start the RRC connection request process, and then transfer the Service Request to the CN via the air interface (UU) Initial Direct Transfer (IDT) message and interface uplink (IU) message. If the NAS of the UE informs the RRC layer to start fast call setup procedure, then the process proceeds to Step 2.

Step 2: Non-critically extending the RRC Connection Request message to dispose the NAS Service Request message and the necessary Access Stratum (AS) information into the extended portion. The necessary AS information can include the compulsory Information Elements (IE) in the Initial Direct Transfer (IDT) message. The RNC, after receiving the extended RRC Connection Request message, encapsulates the NAS Service Request message into an IU message, and then transmits the IU message to the CN.

The method further includes the connection establishment process for an originating UE and a receiving UE. For the originating UE, the connection establishment process includes:

1) Modifying the RRC Connection Request message by encapsulating the NAS Service Request message therein, transmit the NAS Service Request message to the CN via the RNC. In response, the CN transmits the RAB Assignment Request message to the RNC;

2) Modifying the RRC Connection Setup message by adding RB parameters corresponding to the requested service. The RNC then maps from RAB to RB parameters after receiving the RAB Assignment Request message, and then informs the UE to establish both the signaling channel and the service channel via the extended RRC/RB Connection Setup message.

3) After receiving the extended RRC/RB Connection Setup message, the UE configures the signaling channel and the service channel at the same time. After completing physical layer synchronization, the UE transmits a RRC Connection Setup Complete message via the dedicated signaling channel, indicating that signaling and service channel setup is successful.

For the receiving UE, the connection establishment process is similar to that of the originating UE except the addition of a paging process.

In one aspect of the embodiment described above, parameters, such as RLC, MAC, Transport Channel (TrCH), PhyCH, corresponding to the service are added to the RRC Connection Setup message. In another aspect of the embodiment, a default configuration or a pre-configuration can be utilized, and semi-static channel parameters (e.g., RB, RLC, and TrCH) corresponding to signaling and service can be stored in the UE. In a further aspect of the embodiment, the RRC Connection Setup Complete message can be modified, i.e., by adding content relating to the successful RB setup. In a further aspect of the embodiment, for the receiving UE, the paging message is derived by adding an indicator of service type to be established to an original paging message. If the receiving UE determines that the service requested is a PoC service, the receiving UE uses signaling procedures corresponding to an optimized scenario, Embodiments according to the present invention have the following technical results:

1. The modification of the RRC Connection Setup message, including encapsulating the NAS Service Request message, can enable the RNC to send the NAS Service Request to the CN earlier so that the CN can send the RAB Assignment Request to the RNC earlier than in present systems.

2. Embodiments of the method do not include the procedures of Authentication, Ciphering, Security Mode, TMSI reallocation during call setup to simplify NAS signaling, and thus, call setup delays can be shortened.

3. During operation, the RRC Connection Setup message is modified by adding parameters such as RB, RLC, MAC, TrCH, PhyCH corresponding to the desired service. The RNC maps the RAB to RB parameters after receiving the RAB Assignment Request message from the CN, and sends the extended RRC Connection Setup message to inform the UE to establish both signaling channel and service channel. Furthermore, a default configuration or a pre-configuration can be utilized, and semi-static channel parameters (such as RB, RLC, TrCH) corresponding to signaling and service can be saved in the UE in advance to decrease the size of RRC Connection Setup message. As a result, transport delay of the RRC Connection Setup message can be shortened. Also, combining the RRC Connection Setup and RB Setup processes can reduce call setup delays.

Example

The present disclosure provides a method of UU message transfer for fast call setup. The following description uses a call setup procedure for a PoC Service as an example for illustration purposes. As further described below, in one aspect, the procedure includes encapsulating a Service Request in a RRC Connection Request message. The procedure includes the following steps:

Step 1: When a UE starts a service sensitive to call setup delays, the NAS of the UE informs the RRC layer whether to start fast call setup procedure. If the NAS of the UE informs the RRC layer not to start fast call setup procedure, the RRC proceeds according to the 3GPP protocol 25.331, i.e., directly starting a RRC connection request process, and then transfer the Service Request to the CN via the air interface (UU) Initial Direct Transfer (IDT) message and interface uplink (IU) message. If the NAS of the UE informs the RRC layer to start fast call setup procedure, then the process proceeds to Step 2.

Step 2: Non-critically extending the RRC Connection Request message to dispose the NAS Service Request message and the necessary Access Stratum (AS) information into the extended portion. The necessary AS information can include the compulsory Information Elements (IE) in the Initial Direct Transfer (IDT) message, such as "CN domain identity" and "Intra Domain NAS Node Selector". For example, a new IE "NAS related Message" can be inserted into the RRC Connection Request message, and the Service Request and the necessary Access Stratum (AS) information can be disposed in this new IE. The Service Request corresponds to the IE NAS Message, and the AS information can correspond to the IE "CN domain identity" and "Intra Domain NAS Node Selector", whose assignment principle is the same as that of the corresponding IE of the IDT message.

The RNC, after receiving the extended RRC Connection Request message, can process the received message as follows:

The RRC layer of the RNC reads the IE "NAS related Message," and then encapsulates "NAS message" into an IU interface Initial UE Message according to "CN domain identify" and "Intra Domain NAS Node Selector," and then transmits the Initial UE Message to the CN.

Figure 3:
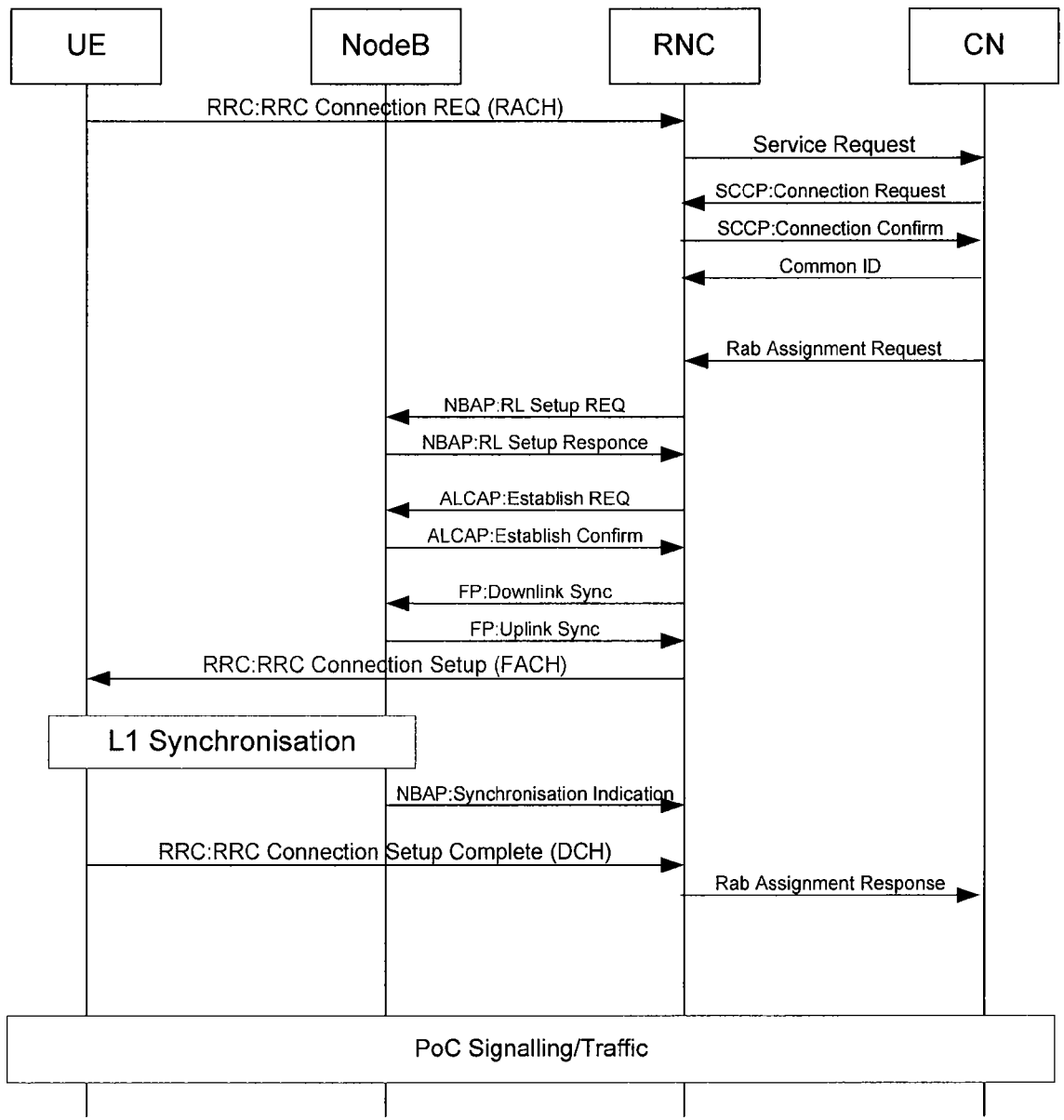
FIG. 3 is a flow chart of a call setup process in accordance with an embodiment of the invention.
Figure 4:
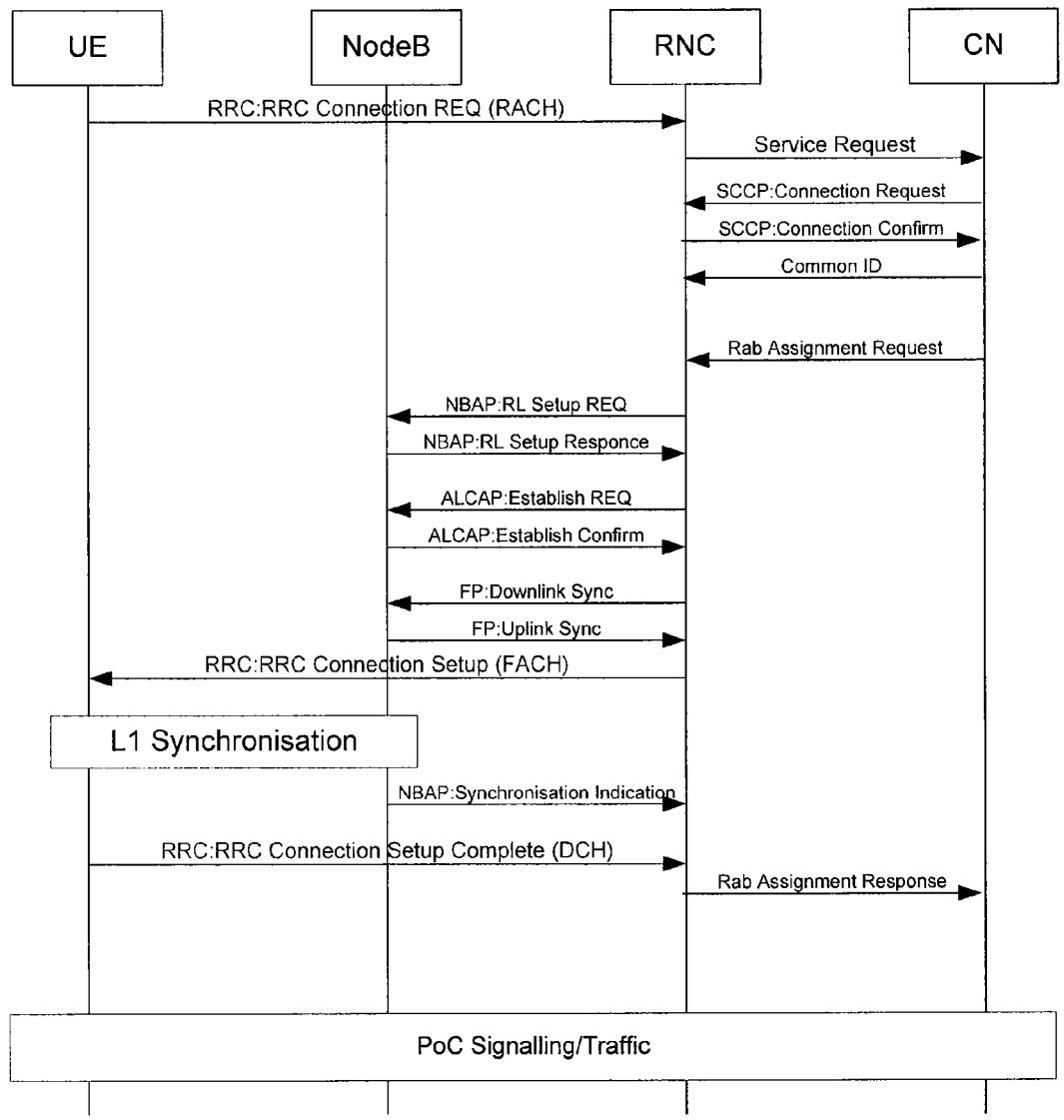
FIG. 4 is a flow chart of a call setup process in accordance with an embodiment of the invention.

FIG. 3 and FIG. 4 illustrate the signaling/data connection process at the originating end and the receiving end.

For the originating UE:

1. The RRC Connection Request message is modified to encapsulate the NAS Service Request. As a result, the RNC can send the Service Request to the CN earlier, so that the CN can send the RAB Assignment Request to the RNC earlier.

2. During Call Setup, not performing authentication, encryption, Security Mode configuration, and TMSI reallocation procedures. This can simplify NAS signaling to shorten call setup delays.

3. The RRC Connection Setup message of the originating UE (called RRC/RB Setup message) is modified to add parameters corresponding to the service requested, such as RB, RLC, MAC, TrCH, and PhyCH. The RNC maps the RAB to the RB parameters after receiving the RAB Assignment Request message from the CN, and sends the extended RRC Connection Setup message to the UE informing the UE that both the signaling channel and the service channel need to be established. Furthermore, default configuration or pre-configuration can be utilized to store semi-static channel parameters (e.g., RB, RLC, TrCH) in the UE in advance to decrease the size of RRC Connection Setup so that transport delay of RRC Connection Setup can be shortened. Combining the RRC Connection Setup and the RB Setup can shorten call setup delays.

4. The UE configures signaling and service channels at the same time after receiving the extended RRC Connection Setup message. After physical layer synchronization is performed, The UE transmits the extended RRC Connection Setup Complete message (this message is derived from modifying the RRC Connection Setup Complete message by adding the RB Setup Complete message into the RRC Connection Setup Complete message) on the dedicated signaling channel, indicating that signaling and service channel setup is successful.

For the receiving UE, the procedures are similar to those of the originating UE, except the procedures include paging for the receiving UE. The paging message is based on previous paging message with the addition of an indicator of a service type to be established, and procedures invoking an optimization scenario when the UE determines that the new service is a PoC service.

From the foregoing, it will be appreciated that specific embodiments of the invention have been described herein for purposes of illustration, but that various modifications may be made without deviating from the invention. Certain aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

I/we claim:

1. A method for fast call setup for originating User Equipment and a receiving User Equipment, comprising:
   when the originating UE starts a service sensitive to call setup delays, NAS (Non-access Stratum) of the UE informing a RRC layer whether to start fast call setup procedure,
   If not, the RRC (Radio Resource Control) starting RRC connection request directly, and transferring the Service Request to the CN via the air interface (UU) Initial Direct Transfer (IDT) message and interface uplink (IU) message after RRC connection is successful;
   otherwise, non-critically extending the RRC Connection Request message;
   disposing a NAS Service Request Message and Access Stratum (AS) information into the extended portion; and
   RNC, after receiving the extended RRC Connection Request, encapsulating the Service Request of Non-Access Stratum into IU message, and sending IU message to CN,
   wherein the method further comprises a connection establishment process for an originating UE and a receiving UE:
   for the originating UE:
   1) modifying the RRC connection Request message by encapsulating the NAS Service Request message therein, and transmitting the NAS Service Request message to the CN via the RNC;
   2) modifying the RRC Connection Setup message by adding RB parameters corresponding to the requested service, and the RNC then maps from RAB (Radio Access Bearer) to RB (Radio Bearer) parameters after receiving the RAB Assignment Request message, and then informs the UE to establish both the signaling channel and the service channel via the extended RRC/RB Connection Setup message;
   3) after receiving the extended RRC/RB Connection Setup message, the UE configures the signaling channel and the service channel at the same time and after completing physical layer synchronization, the UE transmits a RRC Connection Setup Complete message via the dedicated signaling channel, indicating that signaling and service channel setup is successful;
   for the receiving UE: the connection establishment process is similar to that of the originating UE except the addition of a paging process.

2. The method of claim 1 wherein parameters corresponding with the service requested consisting of RLC (radio link control), MAC, Transport Channel (TrCH), PhyCH, is added in the RRC Connection Setup message.

3. The method of claim 1 wherein a default configuration or a pre-configuration is utilized to save in UE Semi-static channel parameters, corresponding with signaling and service.

4. The method of claim 1 wherein the RRC Connection Setup Complete message is derived by modifying the RRC Connection Setup Complete message by adding information relating to RRC connection successful information.

5. The method of claim 1 wherein for the receiving UE, paging message is based on previous paging message with the addition of an indicator of service type.

* * * * *